United States Patent [19]

Cohen et al.

[11] Patent Number: 5,200,056
[45] Date of Patent: * Apr. 6, 1993

[54] METHOD FOR ALIGNING POLE TIPS IN A THIN FILM HEAD

[75] Inventors: Uri Cohen, Palo Alto, Calif.; Nurul Amin, Burnsville, Minn.

[73] Assignee: Seagate Technology Inc., Scotts Valley, Calif.

[*] Notice: The portion of the term of this patent subsequent to Aug. 25, 2009 has been disclaimed.

[21] Appl. No.: 832,431

[22] Filed: Feb. 7, 1992

Related U.S. Application Data

[63] Continuation of Ser. No. 480,558, Feb. 15, 1990, Pat. No. 5,141,623.

[51] Int. Cl.⁵ .............................................. C25D 5/02
[52] U.S. Cl. ..................................... 205/122; 29/603; 156/643; 156/656; 156/659.1; 156/661.1; 204/192.34; 205/135; 205/159; 205/188; 205/221; 360/110

[58] Field of Search ............... 205/122, 135, 159, 188, 205/221; 29/603; 156/643, 653, 656, 657, 659.1, 661.1; 204/192.32, 192.34; 360/110, 119, 120, 125, 126

[56] References Cited

U.S. PATENT DOCUMENTS

| | | | |
|---|---|---|---|
| 4,399,479 | 8/1983 | Meckel | 360/126 |
| 4,436,593 | 3/1984 | Osborne et al. | 204/15 |
| 4,481,071 | 11/1984 | Anderson et al. | 156/656 |
| 4,791,719 | 12/1988 | Kobayashi et al. | 29/603 |

Primary Examiner—John Niebling
Assistant Examiner—William T. Leader
Attorney, Agent, or Firm—Kinney & Lange

[57] ABSTRACT

A thin film magnetic read/write head is manufactured using a multi-layered sacrificial mask in a pole tip alignment process. The sacrificial mask includes a layer of metal deposited upon the magnetic upper pole tip. Subsequent sacrificial mask layers include nickel-iron alloy or photoresist. Following an ion milling alignment process, residual sacrificial mask layers are removed using a process in which the medal layer is selectively chemically etched away from the thin film magnetic head.

1 Claim, 4 Drawing Sheets

METHOD FOR ALIGNING POLE TIPS IN A THIN FILM HEAD

This is a continuation of application Ser. No. 07/480,558, filed Feb. 15, 1990, now U.S. Pat. No. 5,141,623.

REFERENCE TO APPLICATIONS

Reference is hereby made to the following co-pending patent applications filed on even date herewith and assigned to the same assignee: "TOP POLE PROFILE FOR POLE TIP TRIMMING" U.S. Pat. No. 5,116,719 issued May 26, 1992 and "SELF ALIGNED MAGNETIC POLES USING SACRIFICIAL MASK" U.S. Pat. No. 4,922,901, issued Feb. 12, 1991.

BACKGROUND OF THE INVENTION

The present invention relates to production of thin film magnetic heads. In particular, the invention relates to aligning the upper and lower pole tips in a thin film magnetic head using a sacrificial mask layer.

Thin film magnetic read/write heads are used for magnetically reading and writing information upon a magnetic storage medium such as a magnetic disk or magnetic tape. It is highly desirable to provide a high density of information storage on the magnetic storage medium.

Increased storage density in a recording system may be achieved by providing an areal density as high as possible for a given recording surface. In the case of rotating disk drives (both floppy and hard disk), the areal density is found by multiplying the number of flux reversals per unit length along the track (linear density in units of flux reversals per inch) by the number of tracks available per unit length in the radial direction (track density in units of tracks per inch).

The demand for increased storage density in magnetic storage media has lead to reduced magnetic head dimensions. Magnetic heads are now fabricated in a manner similar to that used for semiconductor integrated circuits in the electronic industry.

During fabrication, many thin film magnetic heads may are deposited across the entire surface of a wafer (or substrate). After the layers are deposited, the wafer is "diced" or sliced into many individual thin film heads, each carried by a portion of the wafer so that an upper pole tip, a lower pole tip, and a gap are exposed. Pole tips and gap (and the portion of the substrate which underlies them) are then lapped in a direction generally inward, toward the center of thin film head, to achieve the desired dimensions. This lapping process is a grinding process in which the exposed portion of top and bottom pole tips and gap are applied to an abrasive, such as a diamond slurry. Electrical contacts are connected to conductive coils. The completed head is next attached to a carrying fixture for use in reading and writing data on a magnetic storage medium such as a computer disk.

In operation, a magnetic storage medium is placed near the exposed upper and lower pole tips. During the read operation, the changing magnetic flux of the moving storage medium impresses a changing magnetic flux upon upper and lower pole tips. This magnetic flux is carried through the pole tips and yoke core around the conductor coil. The changing magnetic flux induces an electrical voltage across the conductor coil which may be detected using electrical detection circuitry. The electrical voltage is representative of the changing magnetic flux produced by the moving magnetic storage medium.

During a write operation, an electrical current is caused to flow in the conductor coil. This electric current induces a magnetic field in top and bottom magnetic poles and causes a magnetic field across the gap between the upper and lower pole tips. A fringe field extends in the vicinity beyond the boundary of the pole tips and into the nearby magnetic storage medium. This fringe field may be used to impress magnetic fields upon the storage medium and write information.

There are two methods used to fabricate magnetic thin film heads, either additive or subtractive. The additive approach is the dominant approach and involves a series of processing steps in which the various layers of the thin film head are deposited upon a wafer substrate. The highest track density achievable is strongly influenced by the accuracy of alignment of upper and lower pole tips and their width. Magnetic pole tips typically have a pole thickness in the range of about one micron to about five microns depending upon the design criteria, i.e. a thicker pole for better overwriting efficiency and a thinner pole for increased resolution capability during the readback operation. The physical shape of upper and lower pole tips and gap significantly affect the reading and writing performance of the thin film head by altering the shape of the magnetic fringe field.

As track density increases, currently approaching and exceeding 2400 tracks per inch, the alignment between the upper and lower pole tips in thin film magnetic read/write heads has become critical. At such a high storage density, design criteria require magnetic transducers in which the bottom pole tip width is very nearly the same as the top pole tip width. Top and bottom pole tips should also be in close alignment. At these small dimensions, alignment between the pole tips of a head becomes critical, particularly as dimensions of the pole tips approach the tolerance and definition limits of the deposition techniques. A technique which provides better pole alignment begins with a top pole, bottom pole and a gap area separating the top and bottom poles, all fabricated substantially wider than desired. A narrower mask layer is then deposited upon the upper pole. The structure is then aligned using a material removal process ("milling") such as ion milling or reactive ion milling in which high energy ions bombard the pole tip region to remove the excess material (top pole, bottom pole and gap material) that extends beyond the edges of the mask layer. The mask layer protects only a portion of the top pole, bottom pole and gap so that the width of the completed pole tips is approximately the same as the width of the mask layer.

The noted alignment technique suffers from a number of drawbacks. The mask layer is difficult to remove from the pole tip structure following the milling process. To ensure adequate protection of the pole tips during milling, the mask must be very thick to withstand the milling process. A thick mask, however, decreases the maximum attainable resolution. Furthermore, if the remaining mask material is stripped away following milling, the delicate structure of the thin film head may be damaged. If, on the other hand, the mask layer is made thinner to improve resolution and facilitate removal of the mask following ion milling, the risk of damaging the pole tip structure during milling is increased.

A controllable and readily removable mask layer by selectively etching would be an important contribution to the art.

SUMMARY OF THE INVENTION

The present invention provides closely aligned pole tips in a thin film magnetic transducer which allow increased data storage densities. In the present invention, only the bottom pole and gap layer are trimmed into alignment with the top pole. During ion milling or dry etching of the bottom pole and/or the gap layer, the top pole tip is protected by a sufficiently thick sacrificial metal mask layer which is designed to be easily applied and selectively removed after the milling process. The sacrificial mask is self aligned to the top magnetic pole by depositing it through the same photoresist mask through which the top magnetic pole was deposited.

Using the present invention, a lower pole piece with a wider tip than is necessary in the final design is deposited upon a substrate. Next, gap material is deposited upon the lower pole piece. Coils and insulation are deposited over the bottom pole piece and gap. The coils and insulation are confined to the yoke area and do not cover the bottom pole tip and gap. Finally, an upper pole piece layer is deposited upon the structure. The pole piece is plated through a photoresist mask which has a pole tip width defining the track width in the final design. Prior to milling, the pole tips need not be in perfect alignment. However, the top pole is narrower than the bottom pole, and its projection must be completely enclosed by the bottom pole tip.

Next, another metal layer is deposited upon the upper pole layer through the same photoresist mask used to deposit the top pole layer. This metal layer forms a sacrificial mask for the subsequent ion milling. This metal mask may be any metal or alloy other than the material used for magnetic poles, but it must be selectively etchable, so that the magnetic pole material is not attacked. It must also be compatible for deposition upon the magnetic pole layer. In a preferred embodiment of the present invention, this metal is copper or gold, both of which are already used in the production of thin film heads. Therefore, the geometry of the top pole (and the metal sacrificial mask layer) defines the shape of the bottom pole tip subsequent to milling. Copper is the most preferred metal for reasons of economy, ion milling rates and simplicity.

The metal sacrificial mask layer can be used as a base layer upon which one or more additional sacrificial mask materials are deposited through the same photoresist mask used to deposit the top pole layer and first sacrificial metal mask layer. In one embodiment of the present invention, a layer of nickel-iron alloy is deposited upon the metal sacrificial base layer. Nickel-iron is the material typically used for top and bottom pole layers and is therefore easy to integrate into the manufacturing process. Furthermore, because the sacrificial mask nickel-iron layer will have a milling rate equal to the milling rate of the bottom pole tip layer (since they consist of the same material), an adequate thickness of the nickel-iron sacrificial layer is readily deposited.

After the sacrificial mask layer(s) are deposited, the photoresist mask (through which the top pole and sacrificial metal layer(s) were deposited) is stripped off, the seed layer is removed, the gap material is wet etched or ion milled, and the pole tip structure is exposed to an ion milling process in which high energy ions bombard the surface of the pole tip. The mask protects the areas of the top and bottom pole tips and gap layer directly below the mask from the milling process. Those areas of the bottom pole tip and/or gap layer exposed to the high energy ions are milled away due to the impact force from the ions.

Following the milling process, the top and bottom pole tips and gap layer are in alignment and the excess sacrificial mask layer remains upon the upper pole tip. The wafer is next exposed to a selective chemical etch which etches away the metal or alloy sacrificial layer from the upper pole tip but does not attack the nickel-iron poles or gap materials, and leaves the thin film head structure intact. In a multiple layer sacrificial mask, should any excess nickel-iron sacrificial layer remain on the first metal sacrificial layer, it is removed through "lift-off" in which the underlying metal layer (such as copper) is selectively etched away from below by the action of the chemical etch and the remains of the nickel-iron sacrificial layer falls away.

In another embodiment of the present invention a cured photoresist top sacrificial layer is deposited using standard photolithographic and masking techniques. The photoresist layer is used in place of the sacrificial nickel-iron layer. Photoresist is presently used in the manufacture of thin film magnetic heads and a photoresist sacrificial layer therefore is easy to implement in present day manufacturing processes. Following the process of ion milling, the photoresist is stripped by a photoresist stripper and the copper layer is removed with a copper etch as described above. Any excess sacrificial mask photoresist which remains on the copper layer is removed by "lift off."

A multi-metal layer sacrificial mask is advantageous because a different color second metal layer facilitates end point detection (i.e. when the milling of the nickel-iron is complete, the underlying copper colored mask layer becomes easily visible). The thickness of the nickel-iron second sacrificial layer covering the copper sacrificial layer should be equal to, or slightly less than the thickness of the bottom pole tip. Also, because nickel-iron has a slower milling rate than copper, it helps to reduce the total thickness of the mask.

DESCRIPTION OF THE PREFERRED EMBODIMENT

Figure 1:
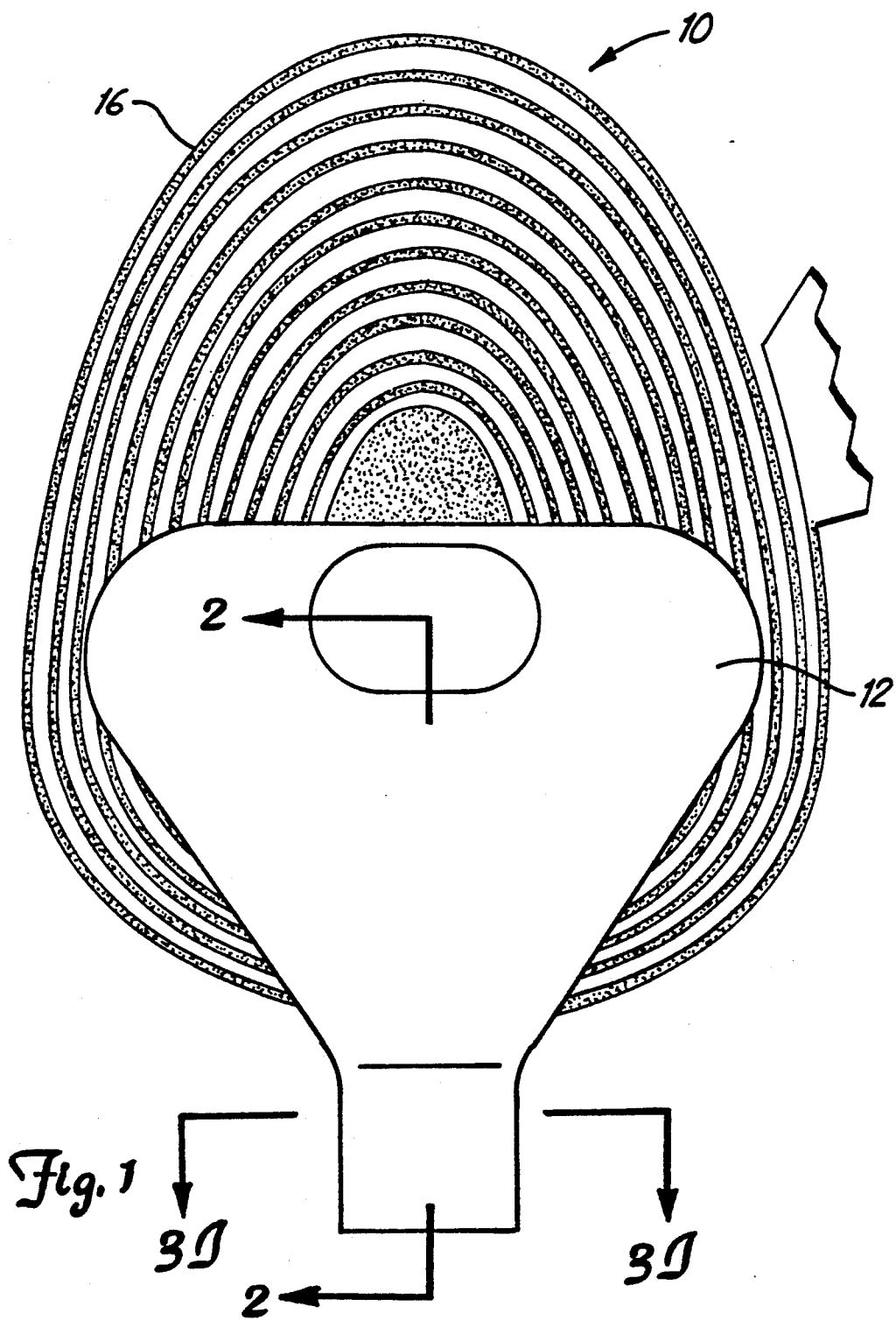
FIG. 1 shows a top view of the thin film magnetic read/write head.
Figure 2:
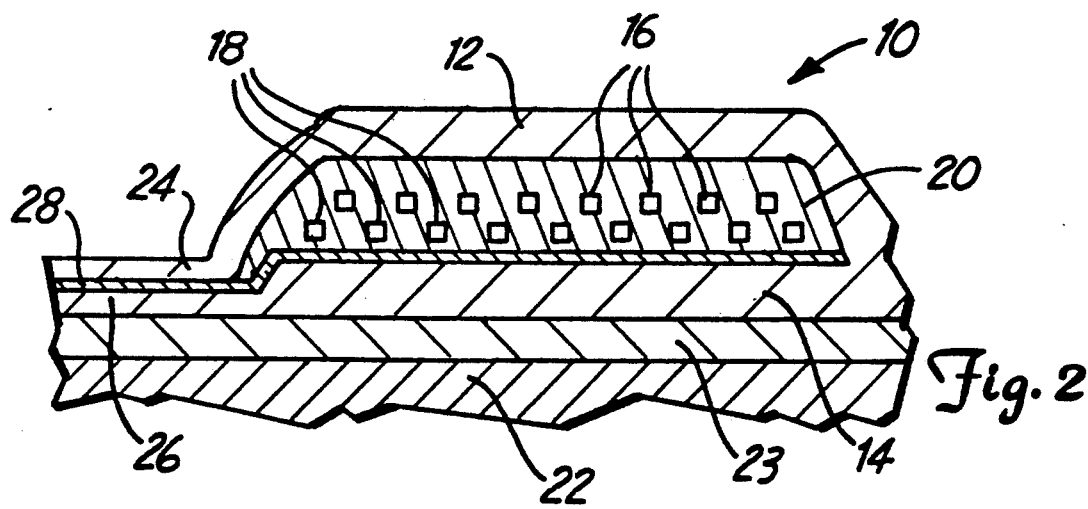
FIG. 2 is a side cross sectional view of the thin film magnetic transducer of FIG. 1 taken along line 2—2.

A multi-turn inductive thin film magnetic head 10 is shown schematically in FIGS. 1 and 2. FIG. 1 is a top view of thin film head 10 and FIG. 2 is a side cross sectional view. Thin film head 10 includes top pole 12 and bottom pole 14 magnetic thin film core which comprise a nickel-iron alloy. Photolithography is used to define the geometry of both top pole 12 and bottom pole 14 of the magnetic core. Conductive coils 16 and 18 extend between top and bottom magnetic thin film poles 12 and 14 and are electrically insulated from magnetic core poles 12 and 14 by an insulating layer 20. Thin film head 10 is deposited upon a nonmagnetic substrate 22 comprising a ceramic compound such as $Al_2O_3$-TiC, and an undercoat 23 of $Al_2O_3$.

In fabricating thin film head 10, several separate pattern transfer processes are used to deposit head 10 upon substrate 22 and undercoat 23. These transfer processes include chemical etching, plating and sputtering. A typical head fabrication process may account for more than a dozen masking levels and more than thirty processing steps.

FIGS. 3A–3I show the steps of pole tip alignment used in the present invention.

Figure 3A:
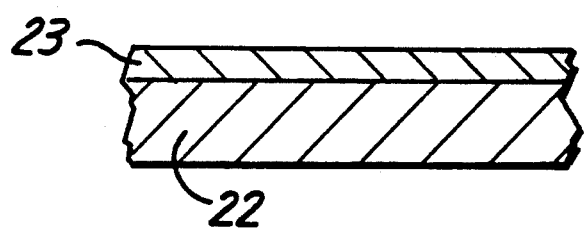
FIGS. 3A–3I illustrate steps in forming the thin film magnetic read/write head of the present invention.

FIG. 3A shows a cross sectional view of substrate 22 and undercoat 23 upon which the deposition process takes place. Substrate 22 and undercoat 23 are generally very large relative to thin film head 10 so that many replicas of head 10 may be deposited across the entire surface of substrate 22 and undercoat 23. The substrate typically comprises an $Al_2O_3$-TiC substrate 22 with an $Al_2O_3$ undercoat 23.

Figure 3B:
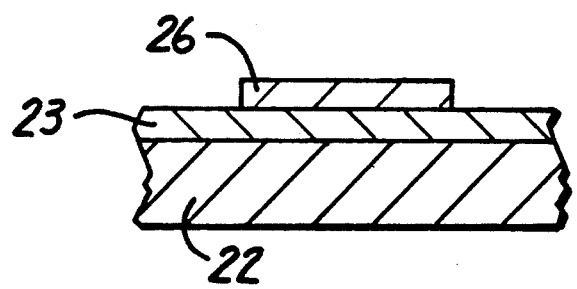

FIG. 3B shows substrate 22 and undercoat 23 of FIG. 3A and including lower pole tip 26 (comprising NiFe) deposited upon substrate 22 and undercoat 23 using photolithographic techniques The view of FIG. 3B shows the width of lower pole tip 26.

Figure 3C:
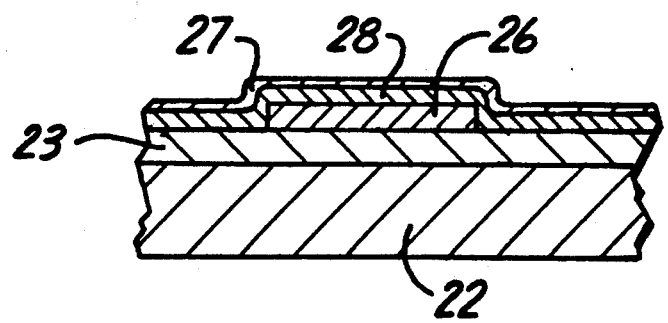

FIG. 3C depicts lower pole tip 26 and including a layer of gap material 28 which also covers substrate 22 and a seed layer 27 which comprises nickel-iron. Seed layers are deposited by sputtering and serve as a base layer for electro-deposition. Gap material 28 typically comprises $Al_2O_3$.

Figure 3D:
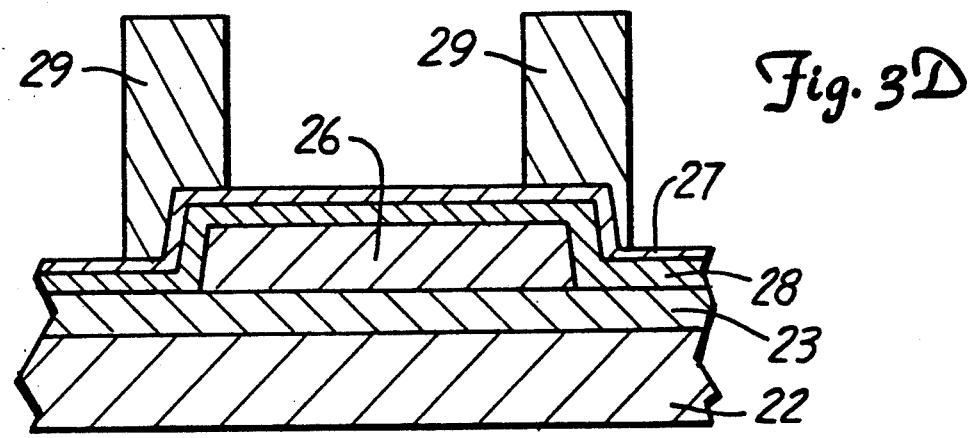
Figure 3E:
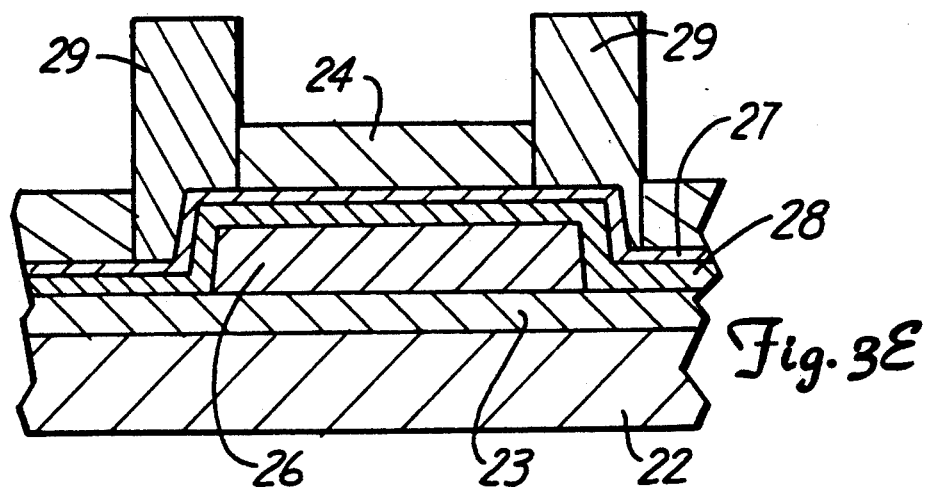
Figure 3F:
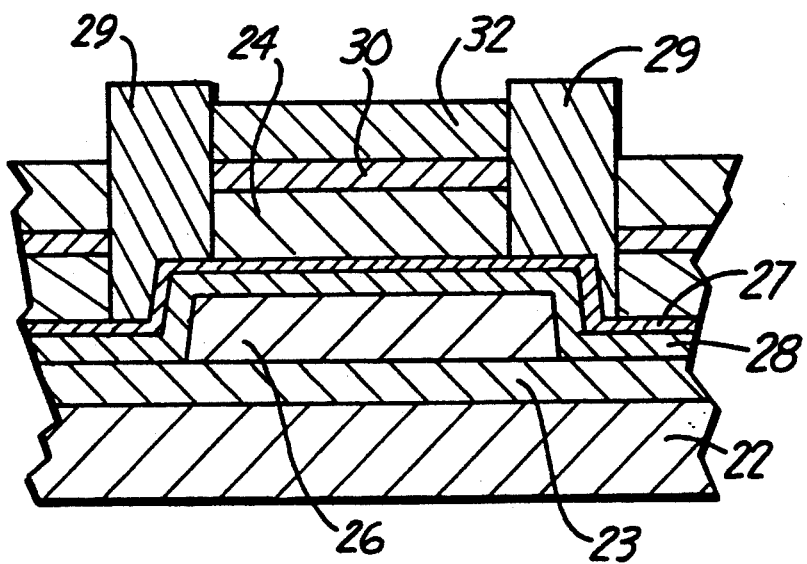

In FIG. 3D, two photoresist dams 29 have been deposited upon gap material 28 and seed layer 27 while leaving uncovered the area where upper pole tip 24 will be deposited. Photoresist 29 may be deposited using standard photolithographic and masking techniques. Upper pole tip 24 (comprising NiFe) is then deposited in the area between photoresist dams 29 upon the exposed portion of gap material 28 and seed layer 27 as shown in FIG. 3E. FIG. 3F shows the pole tip region following deposition of sacrificial mask layers 30 and 32. Although two sacrificial masks are shown in FIG. 3F, the present invention includes the use of a single sacrificial layer. In a preferred embodiment of the present invention, sacrificial layer 30 comprises a copper layer deposited (e.g. by electro-deposition) upon upper pole tip 24. Sacrificial mask layer 32 is then deposited upon copper-sacrificial mask layer 30. Other metals or alloys can also be used in the sacrificial mask. However, copper and nickel-iron are preferred because they are compatible with thin film head manufacturing processes.

Figure 3G:
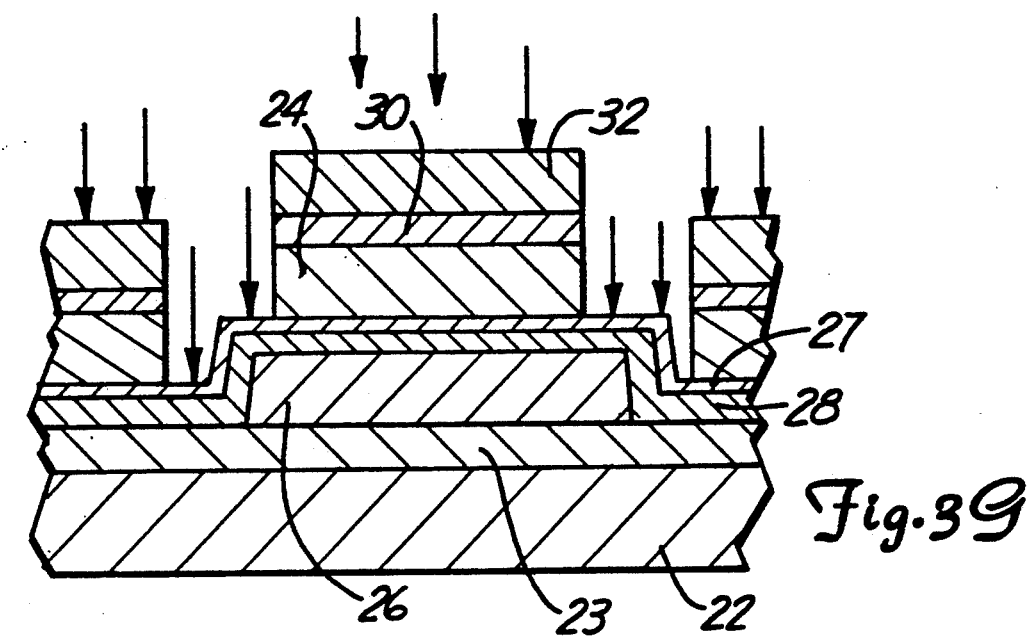

Next, photoresist dams 29 are stripped as shown in FIG. 3G. In one embodiment, seed layer 27, under the dam area, is etched by sputtering or ion milling and the gap layer, under the dam area, is chemically etched with dilute HF, such as 10% by volume (1:10). Alternatively, the seed layer can also be etched chemically. In another embodiment, seed layer 27, gap layer 28 and lower pole 26 are all ion milled in a single step. The advantage of chemically etching either or both seed layer 27 and gap layer 28 is to reduce the thickness of the sacrificial mask. FIG. 3G illustrates the process of ion milling in which ions are accelerated through a charged grid and bombard the surface of the pole tip structure as shown by the arrows. The high energy ions primarily impact the exposed surface of gap layer 28, lower pole layer 26 and the top sacrificial mask layer 32. In a preferred embodiment of the present invention, top sacrificial mask layer 32 comprises nickel-iron alloy wherein the milling rates of sacrificial mask layer 32 and lower pole 26 are substantially equal. The milling conditions are as follows:

| | |
|---|---|
| Voltage | 850 volts |
| Background pressure | $2 \times 10^{-6}$ torrs |
| Argon gas pressure | $2 \times 10^{-4}$ torrs |
| Current density | 0.45 mA/cm$^2$ |
| Tilt angle | 15 Degrees |
| Milling rate of copper | 810 Angstrom/min. |
| Milling rate of nickel-iron | 500 Angstrom/min. |
| Total Milling Time | 50 minutes |

Lower and upper poles thicknesses varied from 2–4 $\mu$m. The alumina gap thickness varied between 0.45–065 $\mu$m. EMT 130 by EM Corporation or acetone is used to remove the photoresist If the pole thickness is 2.5 $\mu$m and gap thickness is 0.6 $\mu$m, the copper and nickel-iron sacrificial mask layer should have a thickness of 2 $\mu$m and 2.5 $\mu$m respectively.

The Cu layer was selectively etched using a mixture of Metex Mu-A and Mu-B (2:1) (Trade name by MacDermid), a copper etchant. The mixture can be diluted with pure water (1:10) to slow the rate of etching.

Figure 3H:
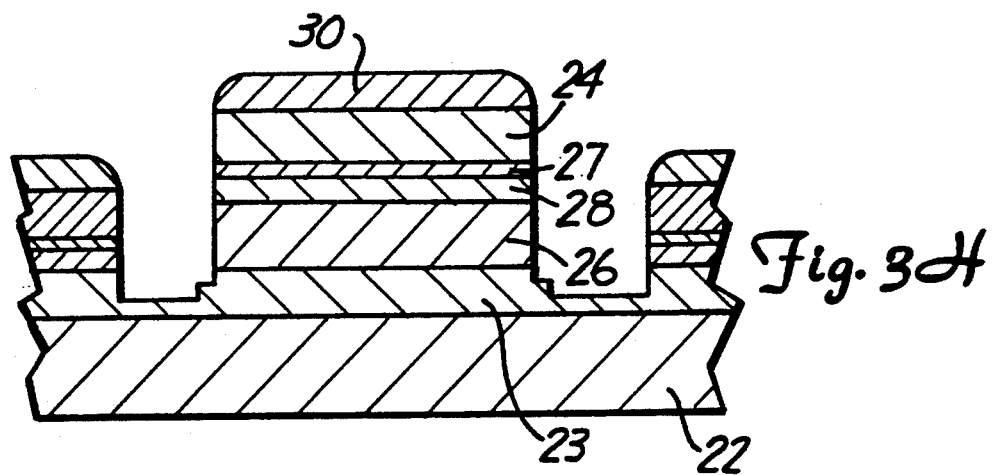
Figure 3I:
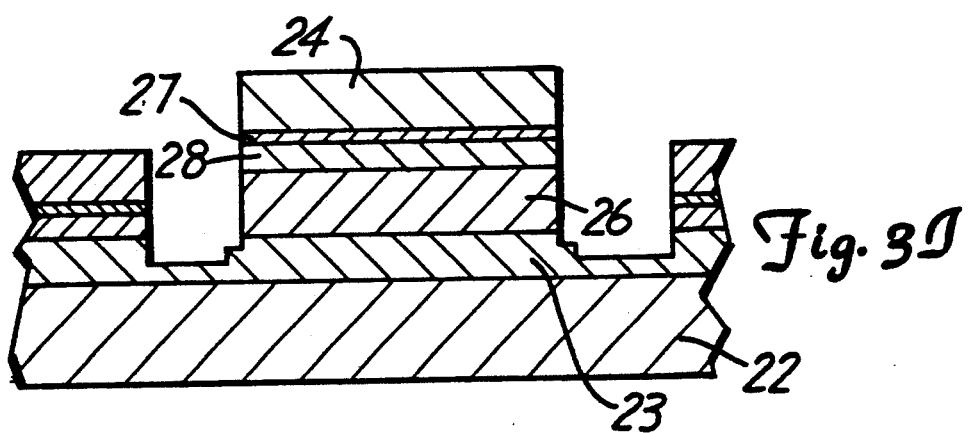

FIG. 3H shows the pole tip structure following the ion milling process in which a residual layer of copper 30 remains upon upper pole tip 24. As shown in FIG. 3H, the milling process has removed the nonaligned portions of lower pole 26. Should residue nickel-iron remain, it is removed using a lift off process in which the copper sacrificial mask layer 30 is stripped away using a copper etch, which leaves the pole tip structure shown in FIG. 3I. A suitable selective copper etch is MU-A and Mu-B (2:1) produced by MacDermid Company. Ammonium per sulfate (120 g/l) with neutral pH is another suitable copper etchant. FIG. 3I is a cross sectional view of FIG. 1 taken along the line labeled 3I—3I.

The gap layer may be etched away prior to milling using HF-$H_2O$(1:10). This should be a short duration etch (about 1–3 minutes) so that metals in the thin film head structure, such as nickel-iron, are not damaged. Photoresist stripper is used to remove the photoresist.

In another embodiment of the invention, the top sacrificial mask layer comprises a photoresist, cured by heat or ultraviolet radiation to induce a negative slope. For example, if the pole tip thickness is 2 $\mu$m and the gap layer thickness is 0.6 $\mu$m, and copper and photoresist sacrificial layers should be 2 $\mu$m and 5–6 $\mu$m, respectively.

In selecting a bottom sacrificial mask layer, the following are useful criteria:
a. The bottom sacrificial mask layer should be different (or chemically distinct) from the underlying magnetic pole layer (nickel-iron).
b. There must be a selective chemical etchant which will not attack the underlying magnetic layer (nickel-iron).
c. The material of the bottom sacrificial mask layer should be compatible with plating through the same photoresist mask used to plate the top magnetic pole layer.
d. The bath used to plate the bottom sacrificial layer should be compatible with the top magnetic layer (nickel-iron) so that there will not be significant or spontaneous reaction.
e. Materials having a slow ion milling rate are desirable.

f. A bottom sacrificial mask layer having a different color than the underlying layer is useful to facilitate end point detection when the sacrificial mask layer is etched.

g. Materials available during thin film head fabrication are desirable to minimize complexity.

Criteria for successive sacrificial mask layers include:

a. The successive sacrificial mask layer(s) should be different (or chemically distinct) from the underlying mask layer.

b. The material(s) of the successive sacrificial mask layer(s) should be compatible with plating through the same photoresist mask used to plate the bottom mask layer.

c. The successive sacrificial mask layer(s) should have a compatible plating bath(s) which will not react significantly and spontaneously with the underlying mask layer.

d. Materials having a slow ion milling rate are desirable.

e. A successive sacrificial mask layer having a different color than the underlying mask layer is useful to facilitate end point detection.

f. Materials already available during thin film head fabrication are desirable to minimize complexity.

Using the present invention, a metal or alloy sacrificial mask layer may be used in aligning pole tips of a thin film head. If a multi-layered mask is used, excess mask material may be removed either selectively with a chemical etchant or with a lift off process in which a lower sacrificial mask layer comprising a metal or alloy is selectively, chemically etched away. The lift off process allows the use of sacrificial layers which would normally be difficult to remove without damage to the magnetic head structure.

Although the present invention has been described with reference to preferred embodiments, workers skilled in the art will recognize that changes may be made in form and detail without departing from the spirit and scope of the invention. For example, metal sacrificial layers such as Sn, Zn, Cd, In, Pd, Os, Rh and Pt, and alloys thereof.

What is claimed is:

1. A method of manufacturing a thin film magnetic head upon a substrate comprising the steps of:

depositing a magnetic bottom pole layer upon the substrate;

depositing a gap material layer upon the magnetic bottom pole layer;

depositing a magnetic upper pole layer upon the gap material layer through a photoresist plating mask;

electroplating through the same photoresist plating mask a selectively etchable platable first metal sacrificial mask layer upon the magnetic upper pole layer;

removing the photoresist plating mask;

removing non-aligned portions of the gap layer and the magnetic bottom pole layer whereby the first metal sacrificial mask layer protects the magnetic top pole layer and the aligned portions of the gap layer and the magnetic bottom pole layer; and selectively chemically etching remaining portions of the first metal sacrificial mask layer with a selective chemical each.

* * * * *